(12) United States Patent
Quang et al.

(10) Patent No.: US 12,006,923 B2
(45) Date of Patent: Jun. 11, 2024

(54) INTAKE SYSTEM FOR AN ATMOSPHERE BREATHING ELECTRIC THRUSTER FOR A SPACECRAFT

(71) Applicant: VKI—von Karman Institute for Fluid Dynamics, Sint-Genesius-Rode (BE)

(72) Inventors: Damien Le Quang, Braine-le-Chateau (BE); Zuheyr Alsalihi, Brussels (BE); Pietro Parodi, Genoa (IT)

(73) Assignee: VKI—von Karman Institute for Fluid Dynamics, Sint-Genesius-Rode (BE)

( * ) Notice: Subject to any disclaimer, the term of this patent is extended or adjusted under 35 U.S.C. 154(b) by 203 days.

(21) Appl. No.: 17/181,731

(22) Filed: Feb. 22, 2021

(65) Prior Publication Data
US 2021/0262454 A1 Aug. 26, 2021

(30) Foreign Application Priority Data

Feb. 25, 2020 (EP) .................................... 20020087

(51) Int. Cl.
*F03H 1/00* (2006.01)
*B64G 1/40* (2006.01)

(52) U.S. Cl.
CPC ........... *F03H 1/0043* (2013.01); *B64G 1/405* (2013.01)

(58) Field of Classification Search
None
See application file for complete search history.

(56) References Cited

U.S. PATENT DOCUMENTS

| | | | |
|---|---|---|---|
| 6,834,492 B2 | 12/2004 | Hruby et al. | |
| 7,581,380 B2 | 9/2009 | Wahl | |
| 2009/0288385 A1* | 11/2009 | Metcalfe, III | F03H 1/0037 60/202 |
| 2015/0240794 A1* | 8/2015 | Berl | F03H 1/0037 60/202 |
| 2019/0344910 A1 | 11/2019 | Reedy et al. | |
| 2019/0390691 A1* | 12/2019 | Friman | F15B 19/005 |

FOREIGN PATENT DOCUMENTS

| KR | 20180064121 A | 6/2018 |
|---|---|---|
| WO | 2017006056 A1 | 1/2017 |

OTHER PUBLICATIONS

Singh, Lake A., "A review of research in low earth orbit propellant collection," Progress in Aerospace Sciences, 75, pp. 15-25, (2015).

(Continued)

*Primary Examiner* — Arun Goyal
*Assistant Examiner* — William L Breazeal
(74) *Attorney, Agent, or Firm* — Banner & Witcoff, Ltd.

(57) ABSTRACT

An intake system for an atmosphere-breathing electric thruster is disclosed, comprising an inlet for inflow of atmosphere particles, an outlet for coupling to the thruster for fueling collected atmosphere particles to the thruster, a collector arranged between the inlet and the outlet comprising multiple channels for allowing inflowing atmosphere particles to pass through the channels towards the outlet, the channels defining an inlet area and a length, wherein a position of at least part of the channels is adjustable to alter at least one of the inlet area and the length.

19 Claims, 9 Drawing Sheets

(56) References Cited

OTHER PUBLICATIONS

Chan, Y.A. et al., "Breakthrough of Inertial Electrostatic Confinement Concept for Advanced Space Propulsion" 69th International Astronautical Congress (IAC), Bremen, Germany, Oct. 1-5, 2018.
Parodi, P. et al., "Study of a collector-intake system for VLEO air-breathing platforms", International Conference on Flight vehicles, Aerothermodynamics and Re-entry Missions and Engineering, European Space Agency (FAR 2019), Monopoli, Italy, Sep. 30-Oct. 3, 2019.
Parodi, P., "Analysis and Simulation of an Intake for Air-Breathing Electric Propulsion Systems", Master Thesis, University of Pisa and von Karman Institute for Fluid Dynamics, (2019).
Aug. 7, 2020—European Search Report—Application No. 20020087.1.

* cited by examiner

INTAKE SYSTEM FOR AN ATMOSPHERE BREATHING ELECTRIC THRUSTER FOR A SPACECRAFT

CROSS-REFERENCE TO RELATED APPLICATIONS

This application claims priority to European patent application EP 20020087.1, filed Feb. 25, 2020, the contents of which are incorporated by reference in their entirety.

FIELD OF THE INVENTION

The disclosure relates to an intake system for an atmosphere-breathing electric thruster (ABET).

BACKGROUND OF THE INVENTION

The need for cost-effective access and operation in space has been a key driver in the development of ever more efficient propulsion technology, whose primary goal is to provide thrust at minimum propellant consumption and system complexity. Ever more efficient means of propulsion are sought both in rocketry and for orbital control, orbit transfer (elliptic orbits) and station keeping of satellites. Regarding the latter case, Low Earth Orbit (LEO) region surrounding Earth is extensively populated by satellites with a multitude of purposes, of which the most common are telecommunications, global position systems, weather systems, surveillance and various research missions (e.g. fundamental physics and astrophysics). The need to reduce altitude from LEO, resulting in a very low earth orbit (VLEO), translates into a more favorable environment for various payloads, including but not restricted to telecommunication, optical systems and other measurement devices. The challenge of VLEO is that unlike LEO the presence of the planet atmosphere presents both a challenge and an opportunity. The atmosphere imparts drag, which rapidly decelerates and de-orbits an orbiting satellite, but at the same time, the presence of atmospheric particles provides the opportunity, possibly in conjunction with a power source, like solar, to collect and energize these particles generating propulsion. If said propulsion is powerful enough to offset the drag penalty, the satellite can theoretically orbit indefinitely.

Prior art in propulsion technology falls mainly into two main categories: chemical propulsion and electrical propulsion. All of traditional space propulsion relies on internal propellant to operate and extend the satellite service time in low earth orbit. Conventional chemical thrusters have evolved into electric thrusters, to extend the service life of orbiting satellites, and also for deep space propulsion to other planets, astral bodies and the sun. Such engines take advantage of the energy of the sun that, when collected by, for example, a solar array, they further energize susceptible propellants, such as mercury, xenon, argon or cesium, transform the solar energy into a useful increase in thrust. Electric propulsion techniques include electrothermal (resistojet, arcjet), electrostatic (ion thruster, Hall effect thruster) and electromagnetic (magneto plasma dynamic thruster, pulsed plasma thruster) among others. Of particular relevance to the present invention are the electric thrusters, with the Hall effect thruster as an example.

Development of atmosphere breathing electric thruster, also known as air-breathing electric thrusters, has been extensive, however primary focus has been given to the ionization and acceleration of the particles to produce thrust, i.e. the thruster itself. Since an intake was not required for developing a conventional satellite for LEO operation, the focus was mainly to enhance the on-board propellant ionization for thrust production. Intake design employed in recent ABET concepts comprise of static straight grids that act to collect high-speed atmospheric particles, and in some cases repel electron streams ejected from the electric thruster outlet. One example is U.S. Pat. No. 7,581,380 to Wahl that describes an improved air-breathing electric thruster specially configured for use in low-earth atmosphere comprising of a housing having an electrically conductive inner surface defining an ionization chamber. There is provided an intake which comprises of a plurality of straight longitudinal screen apertures of square, rectangular, circular or oval apertures sized, configured to allow gas to pass therethrough. Similarly, U.S. Pat. No. 6,834,492 to Hruby et al. relates to an electrically powered air breathing accelerator with an intake designed as with a central cone and a screen at the junction with the thruster for repelling electrons emitted from the cathode located at the exit of the accelerator of the thruster.

Particle collection does not in itself guarantee that the particle remains in the collector, and indeed an efficient confinement strategy is crucial for an effective intake. Various confinement and plasma ejection architectures are available. A recent academic breakthrough (Chan and Herdrich, 2018) demonstrates how particle containment is indeed key for the generation of effective plasma discharges for thrust production. While this principle concerns about plasma containment, the criticality of particle containment upon collection follows the same philosophy. It is agreed by those skilled in the art that an optimum collection design is governed by key performance parameters, such as compression ratio and collection efficiency, which in turn depend on the altitude of the satellite (Parodi, 2019). Since the atmosphere composition and dynamics vary with altitude, which is particularly true for the case of satellites transiting in highly inclined orbits (like polar orbits), these changing conditions ultimately materialize into a variety of angled directions from the incoming atmospheric particles approaching the ABET spacecraft. It is known to those skilled in the art that ineffective particle collection needs to be compensated by higher particle exit velocity from the thruster to achieve a given thrust level. This is unwarranted as a higher exit velocity scales up not only the ionization system, but also the power supply, typically a solar array with possible battery support for operation in the night phase of the orbit. Therefore, while the technology used to ionize and accelerate the gas may differ, the challenge of efficient gas collection is common to all ABET concepts.

Despite the foregoing, there exists the need for a more effective intake design to cope with such changing directions of atmospheric particles in view of enhancing collection, and thus thrust generation capability.

There is a need to provide a generic ABET spacecraft with a more efficient means of collecting high-speed particles, and thus increase the ABET thrust production ability, which ultimately enables the spacecraft to more effectively compensate for induced drag during very low earth orbit.

SUMMARY OF THE INVENTION

Thereto, according to an aspect of the disclosure, there is provided an intake system for an atmosphere-breathing electric thruster, comprising: an inlet for inflow of atmosphere particles; an outlet for coupling to the thruster for fueling collected atmosphere particles to the thruster; a collector arranged between the inlet and the outlet comprising at least one channel for allowing inflowing atmosphere particles to pass through the at least one channel towards the outlet, the at least one channel defining an inlet area and a length; wherein the collector has a conical shape tapering towards the outlet.

By providing the collector as having a conical shape, tapering towards the outlet, an outlet area is smaller than the inlet area. So, a large inlet area can be provided to collect as much air as possible, while due to the smaller outlet area, rebound of particles towards the inlet may be prevented. Thus, a more efficient intake system can be provided for the thruster. With a static, non adjustable conical shape inlet collector, a passive intake system can be obtained. As such, an entirely passive intake system can be provided with optimal effectivity in collecting atmosphere particles. The atmosphere particles typically are air particles, but can be another particle, depending on the atmosphere.

The intake system can comprise of a static assembly of conical longitudinal walls and angled radial fins for optimum collection of high-speed atmospheric particles. The radial fins typically extend between adjacent conical walls, thus forming the longitudinally extending channels of the intake system. Providing multiple channels may reduce as well possible rebound of atmosphere particles towards the inlet.

The length of the at least one channel divided by the inlet area of the said channel, defines the aspect ratio of the collector. The aspect ratio is an indication for the transmission probability of atmosphere particles towards the outlet of the intake system. A higher aspect ratio gives a lower transmission probability.

By providing such a conically shaped collector, the transmission of atmosphere particles from the inlet towards the outlet is promoted despite misalignment of the incoming flow with the flight direction, or ram direction. The direction of the atmospheric wind and the atmospheric co-rotation with the earth induce an angle between the orbital speed and the direction of the flow. In particular for inclined orbits, there typically can be misalignment between the flight direction and the incoming flow direction, which can be understood as an axial direction of the intake system and thruster is not parallel with the direction of the incoming flow. When there is an angle between these two directions, there is misalignment, and the intake system is not optimally oriented to collect as much atmosphere particles as possible. However, due to the conically shaped collector that is tapering towards the outlet, more atmosphere particles can be collected and transmitted towards the outlet than for a conventional intake system having axially oriented channels.

The collector is positioned between in the inlet and the outlet of the intake system. Preferably, an inlet of the collector coincides with the inlet of the intake system. The collector itself can however be shorter than the intake system. The outlet of the collector may be at a distance from the outlet of the intake system, with a chamber in between the collector and the outlet of the intake system for coupling to the thruster.

Advantageously, after the collector, i.e. downstream of the collector, a thermalization chamber can be provided that can be coupled to the inlet of the thruster. Such a thermalization chamber may e.g. be provided to further reduce possible rebound of atmosphere particles towards the inlet of the intake system into space and/or in the thermalization chamber the velocity of the particles may further be reduced. To that end. the thermalization chamber typically may have a conical shape. The ionization chamber is considered to be the first stage of the thruster, slow particles are beneficial to obtain an efficient ionization rate. So, a thermalization chamber downstream of the collector in which the particles are further slowed down, may aid in obtaining a beneficial ionization. The thermalization chamber can be at least partially conically, which further may reduce the rebound of particles towards the inlet of the intake system.

The conically shaped collector can be provided in a cylindrical housing, thereby creating space between an outer conical wall and the cylindrical wall of the housing. In such space, sensors or other equipment can be housed.

The intake system is placed upstream of the thruster, and is coupled thereto, as to make a fluid connection with the thruster, such that particles flowing out of the intake system are fueled directly to the thruster for ionization and acceleration. The thruster coupled to the intake system comprises an ionization chamber for ionizing the collected atmosphere particles as a preparation for subsequent acceleration by various means, such as electrothermal, electrostatic or electromagnetic, to produce thrust.

So, a more efficient means of collecting high-speed particles is provided, and thus the ABET thrust production ability can be increased. This ultimately may enable the spacecraft to more effectively compensate for induced drag during very low earth orbit. This compensation could ideally, if sufficiently high, even allow the spacecraft to operate without orbital decay for an undetermined period of time. All energy consuming processes such as the ionization and acceleration are powered by a dedicated power source that can be either solar panels and/or batteries.

An interface wall can be envisaged between the thermalization chamber of the intake system and the ionization chamber of the thruster, which for example can have a series of tubes, gaps and/or geometric openings that allow collected thermalized particles to transit into the ionization chamber. These transmission paths can be located at different radial positions on the wall to comply with the overall system architecture. It follows that the more particles are collected, the more thrust production capability the ABET will have.

By providing such an intake system having a collector with a conical shape that is tapering towards the outlet, the collection capability of the intake system has become larger, thereby increasing the effectiveness of harvesting of high-speed atmospheric particles in the atmosphere. The cone shape can be embodied with angled longitudinal and radial collector walls, wherein the longitudinal collector walls preferably form the cone shape. The radial collector walls may extend between adjacent longitudinal collector walls to form multiple channels. The conical design, limits the possibility of a collected high-speed particle to rebound back towards the inlet of the intake system into space.

By further providing a conical deflection surface downstream of the collector of the intake system to deflect the trajectory of the collected high-speed particles away from a direct line of sight of the inlet of the intake system, the aforementioned particle rebounding effect can be further reduced. The conical deflection surface may be arranged in the thermalization chamber, downstream of the collector, of the intake system and/or may be arranged at the outlet of the intake system. The cone of the conical deflection surface is facing towards the intake for optimal rebounding.

According to another aspect of the disclosure, the intake system can be adjustable, in particular, parts of the intake system may be adjustable. During orbiting, the environmental conditions, atmosphere, mission conditions may vary, and it may be that the inlet of the intake system is not always aligned with the incoming flow. The orientation of the spacecraft, and thus of the thruster and the intake system connected with it, may be adjusted. However, this may require a relatively large amount of energy, and when the conditions vary too often, such adjusting of the orientation is rather inefficient. In order to improve the effectivity of the particle collection of the intake system, parts of the intake system can be made adjustable. In particular, such parts of the intake system can be adjustable that change the aspect ratio of the collector. The aspect ratio is defined as the length of the at least one channel of the collector divided by the inlet area of the said channel. By changing the aspect ratio, the transmission probability of the atmosphere particles towards the outlet of the collector, and thus, towards the thermalization chamber downstream of the collector is modified. Variation of the aspect ratio, by adjusting parts of the intake system, makes it possible to cope with diurnal atmospheric variability and different engine operating requirements.

In particular, there can be provided for an intake system for an atmosphere-breathing electric thruster, comprising: an inlet for inflow of atmosphere particles, an outlet for coupling to the thruster for fueling collected atmosphere particles to the thruster, a collector arranged between the inlet and the outlet comprising multiple channels for allowing inflowing atmosphere particles to pass through the channels towards the outlet, the channels defining an inlet area and a length, wherein a position of at least part of the channels is adjustable to alter at least one of the inlet area and the length. The multiple channels can be arranged as a grid of channels having walls extending over the length of the collector. The multiple channels may extend in a longitudinal direction parallel to a central axis of the intake system. Alternatively, the multiple channels may extend in a longitudinal direction under an angle with a central axis of the intake system, thus providing for a conically shaped collector. Typically, the collector may then be shaped as a truncated cone. Providing multiple channels reduces the possibility of rebound of particles towards the inlet of the collector. The collector itself is positioned between the inlet and the outlet of the intake system and may have the same length as the intake system. Alternatively, the collector may have a shorter length than the intake system, and preferably an inlet of the collector coincides with the inlet of the intake system. Then, a thermalization chamber may be provided downstream of the collector in the intake system. In such a thermalization chamber, for example a conical deflection surface can be provided that is facing the inlet. Providing such a conical deflection surface further prevents rebound of particles towards the inlet. The collector can be provided in a housing, which housing can be tubular shaped, or, in case of a conically shaped collector, the housing can be conically shaped as well. Also, part of the housing may be conically shaped, for example the part enclosed the thermalization chamber.

Various parts of the collector of the intake system can be adjustable. For example, at least a part of the walls of the channels is adjustable by rotation and/or translation. The multiple channels of the collector, may be provided by guide surfaces formed by circumferential plates or walls and lateral guide plates or radial walls placed in between these circumferential plates. The collector comprises at least two circumferential walls with multiple radial walls extending in between to form the channels. The radial walls can be formed as longitudinally extending plates along the circumferential wall, and extending in radial direction, to form longitudinal channels between the inlet and the outlet. The circumferential wall typically are arranged concentrically with respect to each other having a coinciding central longitudinal axis.

The circumferential walls together with the radially extending walls form the walls of the multiple channels that collect and confine incoming atmosphere particles. The circumferential walls can be tubular or cylindrical, or can be conically shaped. The position of the circumferential walls and/or of the radially extending walls can be adjusted, e.g. by rotation and/or translation. By adjusting the position of the circumferential walls and/or of the radially extending walls, the length of the channels and/or the inlet area of the channels of the collector can be modified, thus modifying the aspect ratio of the collector which influences the probability of transmission of the incoming particles towards the outlet of the collector for fueling the thruster. The higher the aspect ratio, the lower the transmission probability, so a low aspect ratio resulting in a high transmission probability is aimed for.

The collector may comprise multiple sections that are subsequent to each other in axial direction of the collector. At least one section can be movable with respect to another section in rotation and/or translation. For example, each section can rotate with respect to an adjacent section, thus altering the length of the channels of the collector. By rotating a section with respect to another section, the radial walls of said section may not be aligned anymore with the radial walls of the adjacent section, thus the length of the channel may be increased, resulting in a modified aspect ratio. Sections may be translated with respect to each other, for example in a telescopic fashion, thereby varying the length of the channels.

When the collector is conical shaped, typically to form a truncated cone, in that the circumferential walls are conically shaped, having in longitudinal direction an angle with the central axis of the intake system, the angle of the circumferential wall forming the cone-shape with respect to an axial direction of the intake system, is adjustable. Advantageously, all circumferential walls are adjusted simultaneously such that all circumferential walls have the same angle with respect to the axial direction. Alternatively, one or a few circumferential walls can be adjusted in angle, such that the cross-section of the channels confined between adjacent circumferential walls also varies.

Advantageously, at least part of the channels is adjustable in function of environmental parameters and/or operation parameters. As such, an optimal aspect ratio of the collector can be obtained to collect and transmit as much atmosphere particles as possible, also when there may be a misalignment between the flight direction and the incoming flow direction, such as with inclined orbits. Thereto, the intake system further comprises a control unit for controlling the position of at least a part of the channels. The control unit can be provided in the intake system, or in the thruster, and is inputted with data obtained from sensors available in the intake system and/or in the thruster, or elsewhere on the spacecraft. A predetermined operational point, or operational window is defined. The sensed data are processed and when there is a deviation with the predetermined point or window, adjusting of some of the parts is instructed by the control unit.

Advantageously, the surfaces of the intake system are resistant to alteration and/or wear. For example, the surfaces may be covered and/or coated with a chemically-resistant material such as a special paint. Such material, or treatment of the surfaces may provide for more wear resistance, thus for a longer lifetime.

A electric motor or drive system can be provided to adjust the parts of the collector of the intake system that are movable in rotation and/or translation. The drive system or motor advantageously is provided in the intake system and can be powered by the additional sources, such as solar panels and/or batteries. At least one motor or drive system may drive at least one adjustable part of the collector. For example, the at least one motor or drive system may drive a section composed of various angled longitudinal and radial collector walls into a preferred conical layout. Additionally and/or alternatively, the intake system may have motor-driven sections that can turn and/or translate controlled by at least one controller to meet, first the requirements of the thruster itself which may need higher compression efficiency in the ignition phase, and secondly, to meet the changing dynamics of the atmosphere as the ABET spacecraft transits around an orbit. Such embodiment allows the intake to adjust and meet the dynamics of a changing atmosphere.

The intake system may further comprise of a control system that can be used to measure a satellite operating parameter with at least one parameter chosen from orientation such as yaw, roll, pitch, speed, altitude, latitude, longitude and type of orbit, wherein the control system is configured to control, based on the operating parameter, at least one chosen from movement of the intake system, movement of the various parts of the intake system to achieve a predetermined alignment target with incoming atmospheric particles for optimum overall particle collection. An environmental parameter may at least be one of temperature, density, velocity of the inflow particles. The control system may be provided with sensor data, the sensor data sensed by various sensors present on the ABET.

Advantageously, a central axis of the intake system is aligned with a central axis of the thruster, as to optimally align the intake system with the thruster and to fuel the thruster with collected particles as efficiently as possible. When the collector is conically shaped, the collector can be mounted in a conically shaped housing, but can be mounted in a cylindrically shaped housing as well. The space thus available between the conical shape of the collector and the cylindrical housing, can be used for payloads, such as e.g., mass spectrometer, antennas and cameras for earth observation missions and/or spacecraft subsystems, e.g., propulsion, thermal, telemetry, power production and distribution, among others. Optimal use of the available space can thus be made.

Additionally, an additional conventional source of propellant designed to assist the spacecraft in situations where the ABET is under experimentation, or no or limited operability can be partially or fully integrated to the thruster and/or to the intake system.

The intake system is lightweight, simple to manufacture and to operate, thereby reducing costs and improving reliability without compromising functionality.

An intake system is provided for an atmosphere-breathing electric thruster device for a spacecraft comprising an inlet, an outlet and an enclosed passage between the inlet and the outlet, the inlet being connected to the very low orbit atmosphere of a planet for ingestion of high-speed particles, the outlet to eject said particles for ionization and acceleration for thrust production, an intake device, such as a collector, positioned in the space between the inlet and outlet that collects and confines said particles, wherein the intake device or collector comprises of guide surface including angled conical circumferential plates or walls and lateral guide plates or radial walls placed in between these circumferential plates, wherein the said conical and lateral plates are at least partially curved.

The intake system is configured to collect the free-flowing stream of high-speed particles from a planetary atmosphere. At least one part chosen from the intake is moveable to adjust the deflection of the intake axis and/or an intake feature to the incoming flow of particles. Optionally, the intake system can comprise a thermalization chamber to further slow down the collected particles and/or to prevent rebound of the collected particles towards the inlet of the intake system. An interface wall with dedicated path manages the transiting of the collected particles from the intake into the ionization chamber, in particular from the thermalization chamber to the ionization chamber of the thruster. The central axis of the intake is at an optimum angle to the trajectory of the incoming planetary atmospheric particles. The adjustable sections of the intake are independently moveable in rotation and/or translation. At least one motor controls the motion of the adjustable sections driven by a controller of a control system. The control system is configured to measure a satellite operating parameter with at least one chosen from orientation such as yaw, roll, pitch, speed, altitude, latitude, longitude and type of orbit, and the control system is configured to control, based on the operating parameter, at least one chosen from movement of the intake device, movement of the various sections to achieve a predetermined alignment target with incoming atmospheric particles for optimum overall collection. The control system may also use environmental parameters, such as temperature, density, inflow velocity. At least one motor controls the motion of the adjustable sections driven by a controller. Payloads and/or subsystems can be embedded within and around the intake system. An additional conventional source of propellant can be partially or fully integrated.

At least one surface chosen from the intake is formed and/or is covered from a material resistant to chemical alteration due to atmospheric particle bombardment.

There is further provided a satellite for very low planetary orbit or for low planetary orbit, including the intake system for an electric thruster.

It is noted that the aspects of the conically shaped collector and of the adjustable parts of the intake system can be considered inventions on their own. However, all aspects of the one can be applied to the other and vice versa. All aspects are mutually combinable, even when not explicitly described in combination.

BRIEF DESCRIPTION OF THE DRAWINGS

Embodiments of the aspects of the disclosure are described exemplary in the following figures.

DETAILED DESCRIPTION OF THE INVENTION

The figures are given by way of schematic representations of embodiments of the disclosure. Like features are denoted with the same or similar reference numbers. The figures are not necessarily drawn to scale and are to be seen as schematic.

Figure 1:
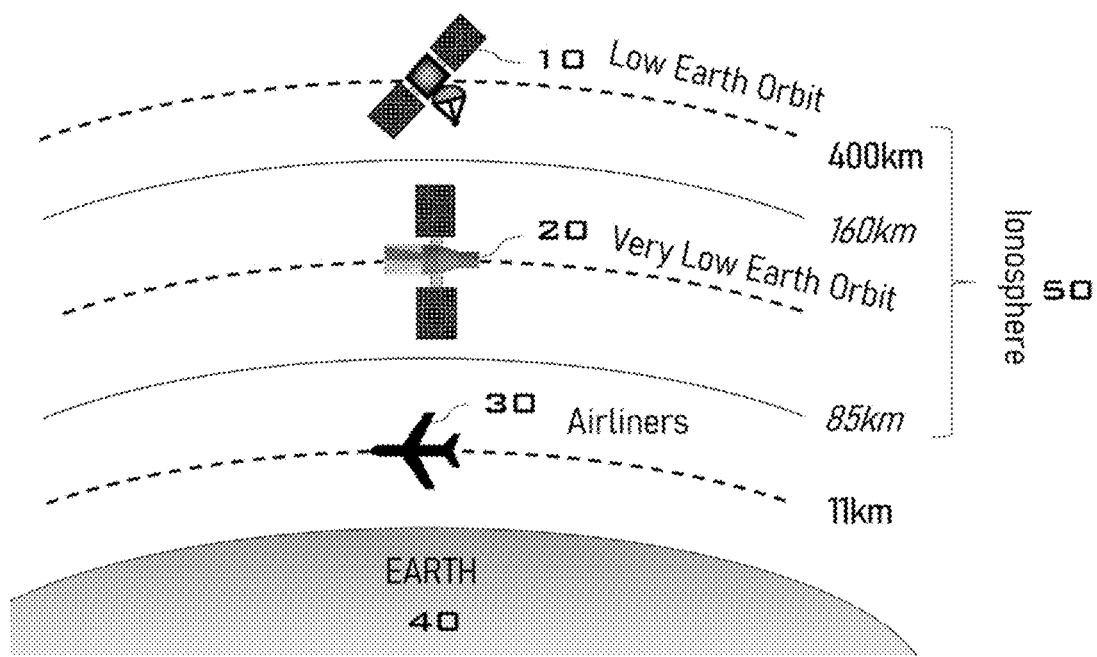
FIG. 1 shows a schematic of the altitude operational region of interest for the novel intake in comparison to other conventional aircraft and spacecraft.

FIG. 1 shows a comparison between the altitudes at which human made craft operate. LEO satellites 10 typically orbit at around 400 km, laying at the edge of the Ionosphere 50 by means of a free-falling trajectory. On the other extreme, airliners 20 conventionally cruise at 11 km from the surface of the Earth 40. This is well within the dense atmosphere which imparts a drag penalty to every aircraft that displaces in it. Airliners 20 overcome this drag by dedicated engines that burn onboard propellant, typically fossil propellant such as kerosene, to generate thrust, overcome drag, and therefore avoid a ballistic trajectory. The airplane is required to employ wings to compensate for the gravitational pull. LEO satellites 10 do not require gravitational compensation due to its free-fall trajectory. However, as the altitude of operation gradually reduces, the aforementioned effect of drag, that affects the aforementioned airliners 20, increasingly affects the orbiting satellite. This requires the satellite to incorporate in its design means for producing thrust to compensate for the said drag, permitting a satellite (in theory) to sustain an orbit indefinitely. It results that the altitude slot of interest in the ionosphere 50 for the operation of a satellite with the Air-Breathing Electric Thruster (ABET) 60 is located between 150 km, where the heat-flux is already reasonable, up to the upper LEO limit at 400 km.

Figure 2:
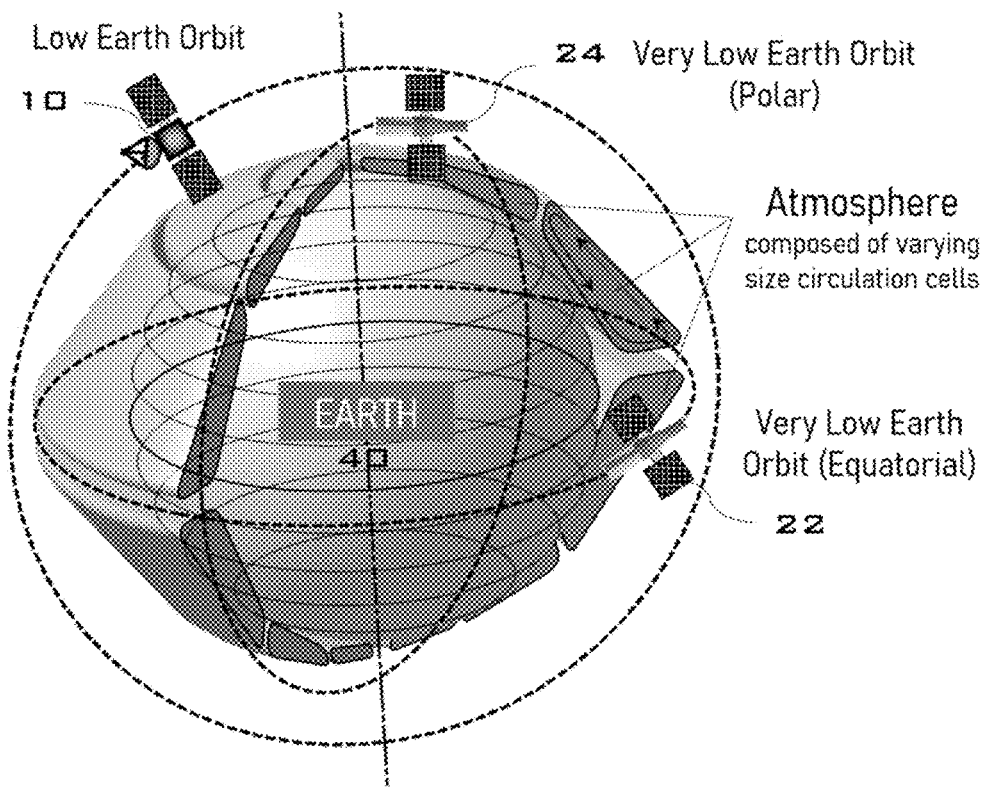
FIG. 2 shows a schematic view of a planet, Earth being a particular example, with its cell-stratified atmosphere and various satellite orbits.

In FIG. 2 is schematically shown how a very low orbit leads to interaction between a satellite and the planetary atmosphere. A planetary atmosphere, such as that surrounding Earth 40, is composed of varying size toroidal circulation cells located at different planetary latitudes, possessing varying thickness/height. A typical LEO satellite 10 transits at the edge of these atmospheric cells regardless of the chosen orbit, and is less susceptible—but not completely immune—to the effects of drag and induced orbital decay, as the ISS periodic reboost to stay in orbit shows. However, a satellite in a lower orbit, say in a VLEO with an equatorial plane 22 or a satellite in a VLEO with a polar orbital plane 24 is much more affected by the effect of drag, as high-energy atmospheric particles in the atmosphere will work to remove momentum from the satellite, leading to a premature orbital decay. This highlights the need for a satellite in a VLEO, being equatorial 22 or polar 24, to have an ABET for drag compensation, to reduce and ideally eliminate orbital decay. Careful inspection of FIG. 2 shows that there is more atmospheric variation along the VLEO orbital path for a satellite in a polar orbit 24 than in an equatorial orbit 22. From an operational perspective, this means that an equatorial orbit has a much more stable atmosphere particle injection for an ABET 60 than a polar orbit due to the varying size and flow direction of the various circulation cells that compose our atmosphere. Hence there is a clear need for a flexible adjustable intake, that further crystallized in the present invention.

Figure 3A:
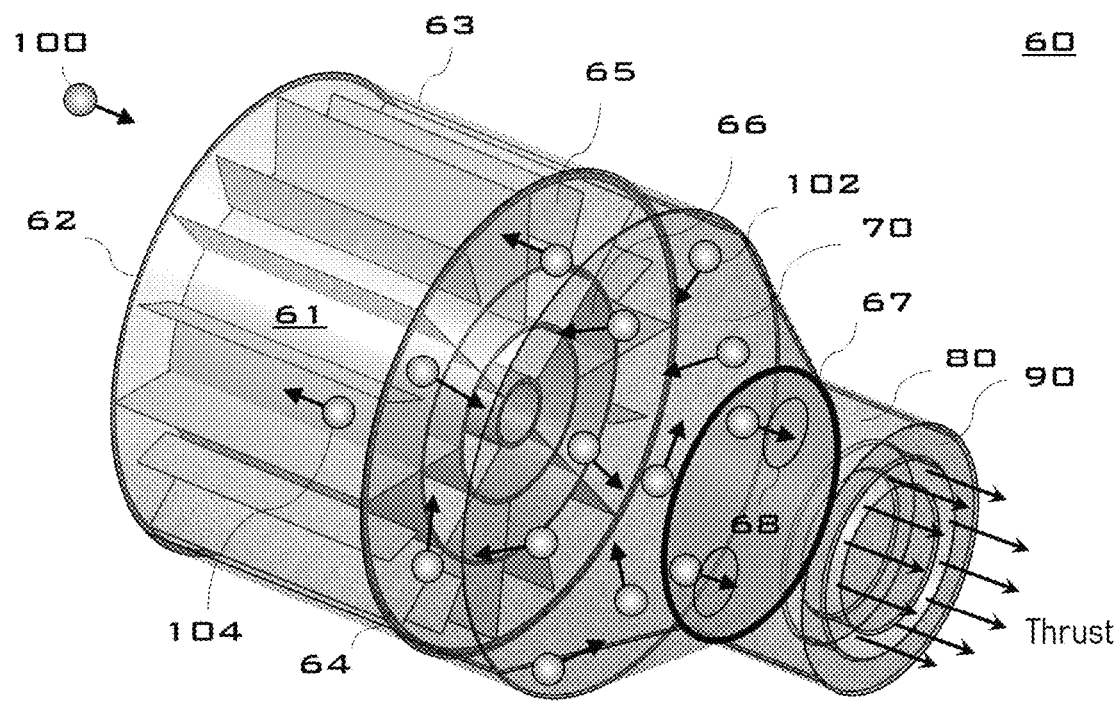
FIG. 3A shows a perspective view of the prior art air-breathing electrical thruster (ABET) with a conventional straight intake layout.

FIG. 3A displays the prior art of an ABET composed of a straight annular intake system 61 having radial grid fins or walls 65, circumferential rings or walls 66. The high-speed atmospheric particle 100 entering through the intake and ABET inlet 62 are channeled by the walls of the various radial grid fins 65 and circumferential rings 66 until it passes through the cylindrical intake outlet 64 into the thermalization chamber 70 of the thruster. But the outcome of the now collected atmospheric molecule 102 depends on its trajectory. That is, said particle 102 assumes a random collision trajectory with the thermalization chamber wall and with other collected atmospheric particles 102 prior to two scenarios, either first the resulting trajectory is such that it moves to the ionization chamber 80, or second the resulting path leads back to the intake exiting as a rebounding atmospheric particle 104. In the first scenario, the collected atmospheric particle, already thermalized in the chamber 70, can be ionized by the action of electromagnetic fields, of which a few options are EM inductive coupling, microwave discharge, electron bombardment and electron cyclotron resonance, in the ionization chamber 80 for subsequent acceleration by virtue of powerful electromagnetic fields, such as those generated using the Hall effect, exiting the ABET outlet 90 producing thrust. In the second scenario, the rebounding atmospheric particle 104 leaves through the inlet of the ABET inlet 62 contributing only to the drag imparted on the ABET satellite 20 i.e., there is no thrust generation by said rebounding particle 104. It is clear that there is a strong need to assure that the design of the prior art intake system 61 is modified to assure as much as possible the rebounding atmospheric particles 104, and thus by definition assuring as much as possible the production of thrust, maximizing the viability and utility of the ABET device in very low earth orbit (equatorial) 22 and, more importantly of an ABET device in very low earth orbit (polar) 24.

Figure 3B:
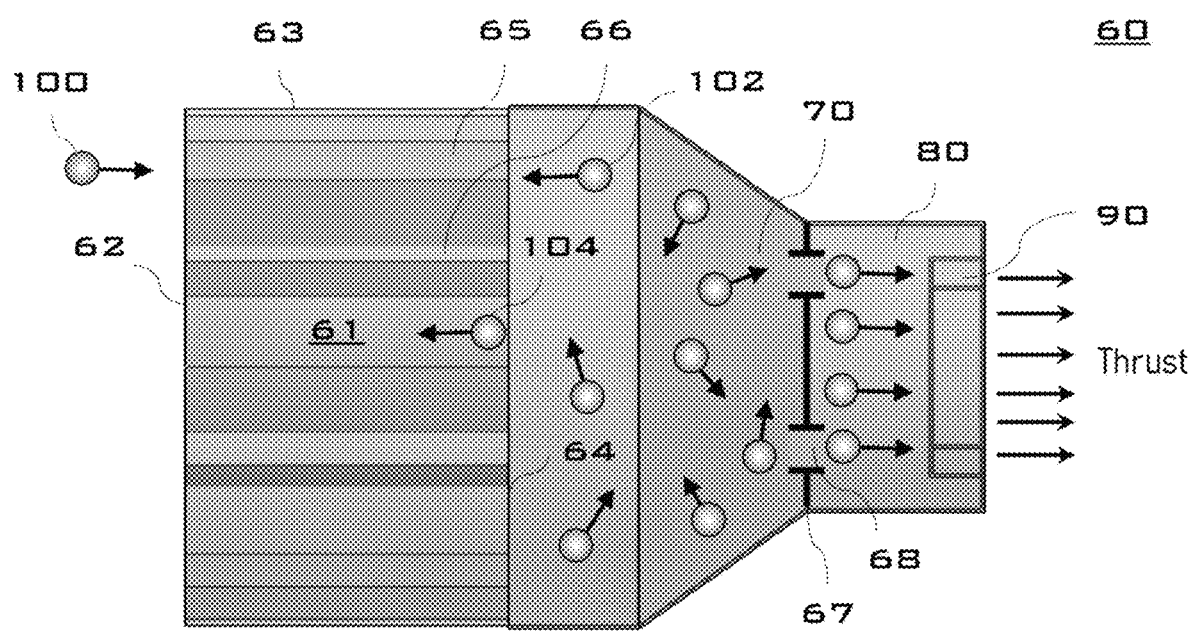
FIG. 3B shows a schematic side views of the prior art ABET according to FIG. 3A.

Therefore, one key problem with the prior art is that the ingested high-speed atmospheric particle 100 can bounce back out as particle 104, due to the wide outlet opening area of such a cylindrical intake. Cylindrical intake outlet 64 is the same size as the cylindrical intake inlet 62, which is particularly noticeable in FIG. 3B showing a side view of FIG. 3A. This large area of the cylindrical intake outlet 64 presents, for a collected atmospheric particle 102, a large field of view through which it can bounce back out of from the thermalization chamber 70 into space, i.e. a rebounding atmospheric particle 104. Such loss of particles through the prior art intake system impacts the ABET device 60 as a direct loss of thrust, since the ionization in chamber 80 and acceleration through the ABET outlet 90 depends on the presence of collected atmospheric particles 102 to produce thrust.

Figure 4A:
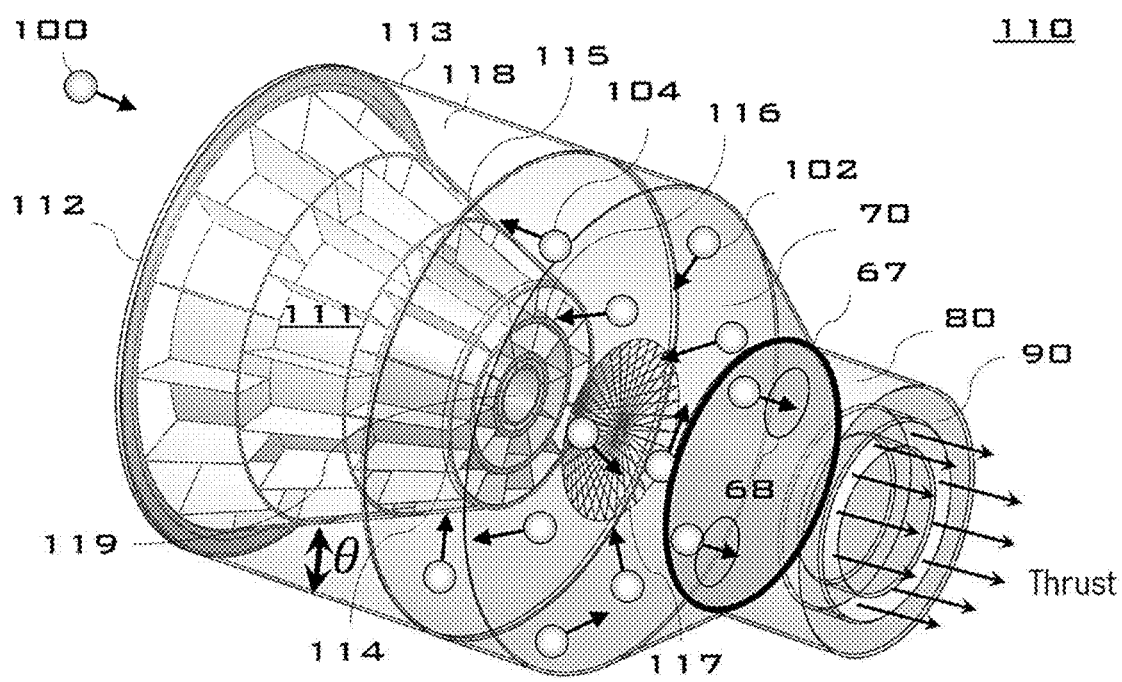
FIG. 4A shows a perspective view of the general ABET with a novel angled intake layout.
Figure 4B:
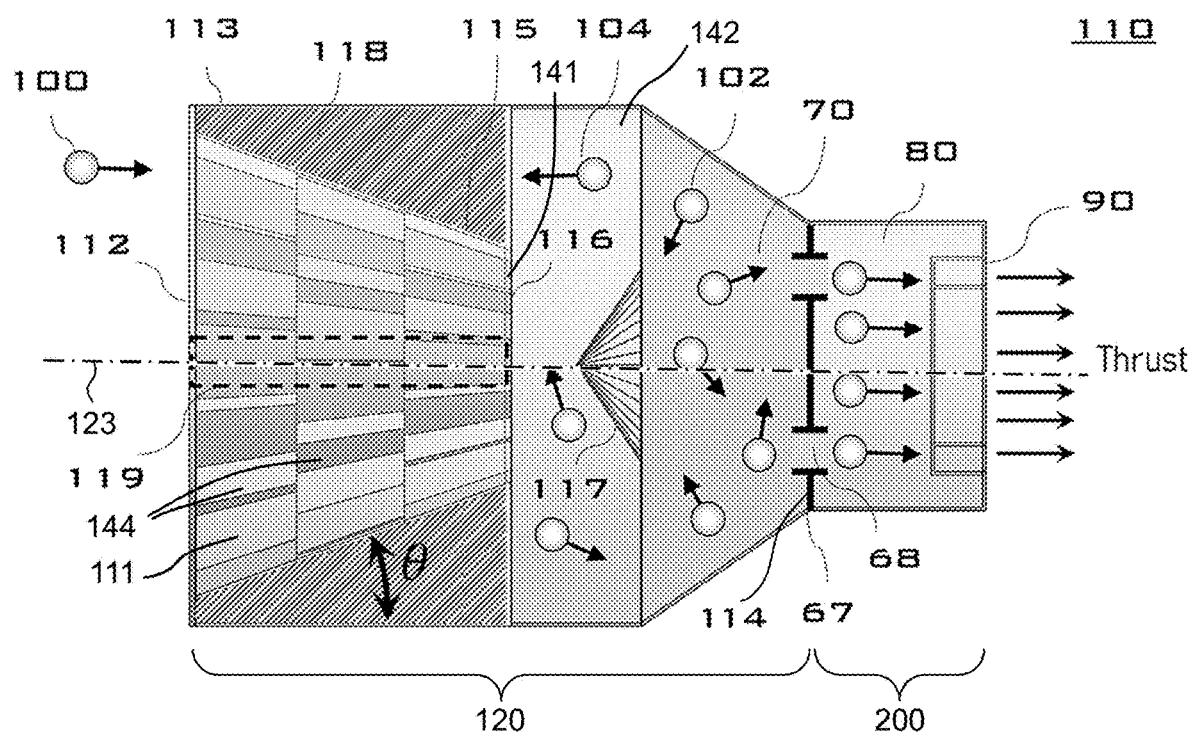
FIG. 4B shows a schematic side view of the general ABET with the novel angled intake layout according to FIG. 4A.

A first embodiment of the intake system 120 according to an aspect of the disclosure is presented as part of the generic ABET 110 in FIG. 4A, the thruster 200 comprising an ionization chamber 80 and an outlet ABET 90 connected to the intake system 120, primarily distinguished by its conical angle θ of the angled longitudinal circumferential—tubular or conical —collector wall 115 and angled radial collector wall 116, both being preferably straight but possibly in a further embodiment at least partially curved. The intake system 120 has an inlet 112 and an outlet 114, and a collector 111 arranged between the inlet 112 and the outlet 114. In this embodiment, the intake system further comprises a thermalization chamber 70 arranged between an outlet 141 of the collector 111 and the outlet 114 of the intake system 120. The collector 111 comprises a number of circumferential walls 116 and radial walls 115 in between. The circumferential walls 116 and the radial walls 115 form channels 144 that collect and confine the particles 100 for transmission towards the outlet 114 of the intake system 120. The channels 144 determine the path the incoming particles 100 can follow. The length of the channel 144 divided by the area of the same channel 144 is known as the aspect ratio. The aspect ratio is an indication of the transmission probability of the particles from the inlet 112 towards the outlet 141 of the collector 111.

The collector 111 has an outlet 141 and an inlet coinciding with the inlet 112 of the intake system 120. In this embodiment, there is a thermalization chamber 142 between the outlet 141 of the collector 111 and the outlet 114 of the intake system 120. Here, in the thermalization chamber 142 a conical deflection surface 117 is present to further prevent rebound of particles 104 towards the inlet 112. Alternatively, the thermalization chamber 142 can be absent.

The collector 111 is placed in a housing 113, which housing here is tubular shaped. With a conical shaped collector 111 there is spare space 118 between the housing 113 and the collector 111, in which spare space 118 payload such as sensors etc. can be positioned.

The thruster 200 and the intake system 120 have a central axis 123 around which the intake system 120 and the thruster 200 are arranged. The intake system 120 can be split into various rotating and translatable sections that add to the flexibility of the intake design to serve a particular setup found optimum, for example by the results of a Monte Carlo simulation. The multiple sections are positioned subsequent to each other in axial direction. The rotational position of the sections with respect to each other is determined once, and then remains static during mission. Thus, a passive intake system is provided.

The trajectory of the incoming high-speed atmospheric particle 100 into the angled conned collector 111 will make the said particle 100 to be deflected by the radial collector wall 115 and cylindrical collector wall 116, funneling and guiding the said particle 100 to subsequently exit through the intake outlet 141 into the thermalization chamber 70. The ABET device 110 may have, as shown in FIG. 4A, a static conical intake system 120 with a collection converging angle θ, that is strongly driven by the material properties, shaping the radial collector wall 115 and circumferential collector wall 116. The said conical intake system 120 is composed of multiple axial sections that can be adjusted, e.g. in rotation, to meet the atmospheric conditions of that particular orbit, such that the intake effectiveness to ingest high speed atmospheric particles 100 of the conical intake system 120 is augmented. An interface wall 67 exists between the thermalization chamber 70 and the ionization chamber 80 comprised of a series of tubes, gaps and/or geometric openings that transit collected thermalized collected atmospheric particles 102 into the ionization chamber 80. These transmission paths 68 across interface wall 67 can be located at different radial positions on the wall to comply with the architectural needs of the spacecraft system. At the outlet 114 of the intake system 120, a conical deflection surface 117 is provided to additionally prevent rebound of any particles 104 towards the inlet of the intake system 120. The conical deflection surface 117 is cone shaped with a point of the cone facing the inlet 112. Alternatively, the conical deflection surface 117 can be shaped as a truncated cone tapering towards the inlet 112.

Figure 5A:
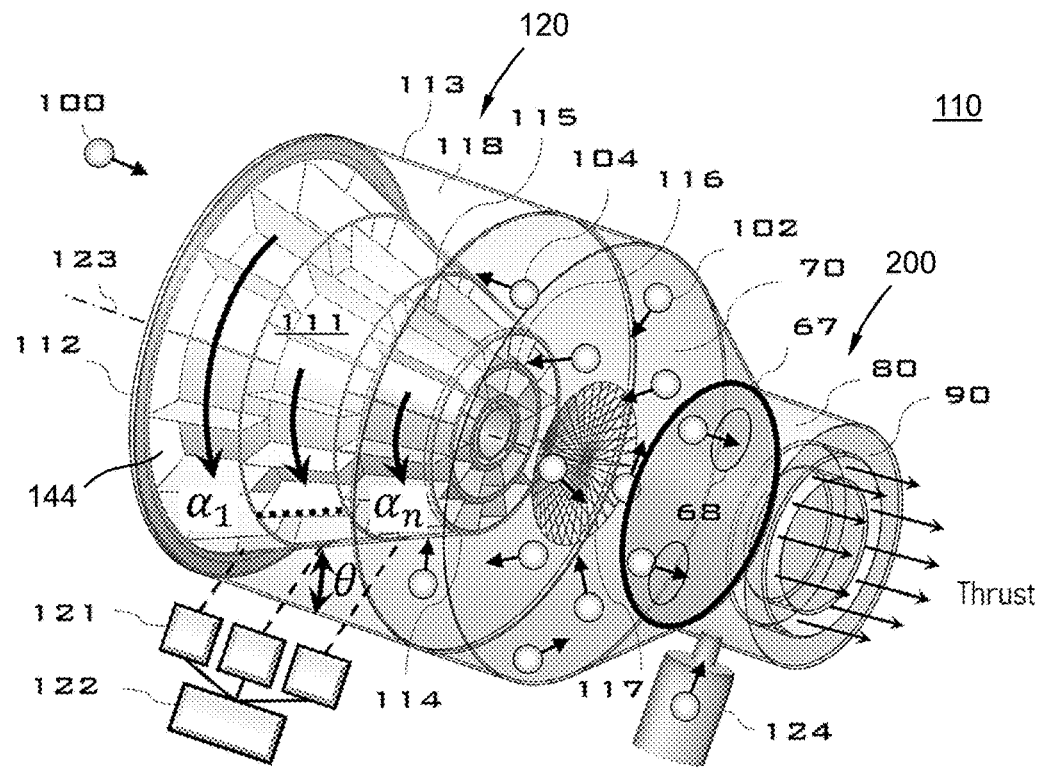
FIG. 5A shows a perspective view of the ABET thruster with a novel moveable motorized and controlled intake layout.

In FIG. 5A is shown a motor-controller variation of the embodiment of FIG. 4A, having at least one motor 121 to adjust angles and relative distance between the sections, together and/or independently, for improved collection control of incoming high-speed atmospheric particles 102. Thus an active intake system 120 is provided. Angles $\alpha\_1$ to $\alpha\_n$ define the rotation of the sections 1 to n around the central intake axis 123. Rotation of the sections with respect to each other changes the length of the channels 144, and thus of the path the incoming particles 100 have to follow. This influences the aspect ratio of the collector 111, and thus of the transmission probability of the particles 100 towards the outlet 141, and thus, towards the outlet 114 for fueling the thruster 200.

At least one dedicated controller 122 drives at least one motor 121 for adjusting the intake conical sections of the intake system 120, as a function of the operational parameters of the ABET powered spacecraft 20 and/or of environmental parameters. Some of the intake geometrical features controlled are, but not restricted to, $\alpha\_1$ to $\alpha\_n$ and θ. The operational parameters are at least one chosen such as yaw, roll, pitch, speed, altitude, latitude, longitude and type of orbit. The environmental parameters can be temperature, density, velocity of incoming flow. Control is achieved by means of one or several motors 121 that are driven by a controller 122, which may be operating one or all motors simultaneously to achieve a predetermined alignment target with incoming atmospheric particles for optimum overall collection. The motors 121, controller 122 and, possibly some sensors, can be arranged in the spare space 118 between the housing 113 and the collector 111.

Figure 5B:
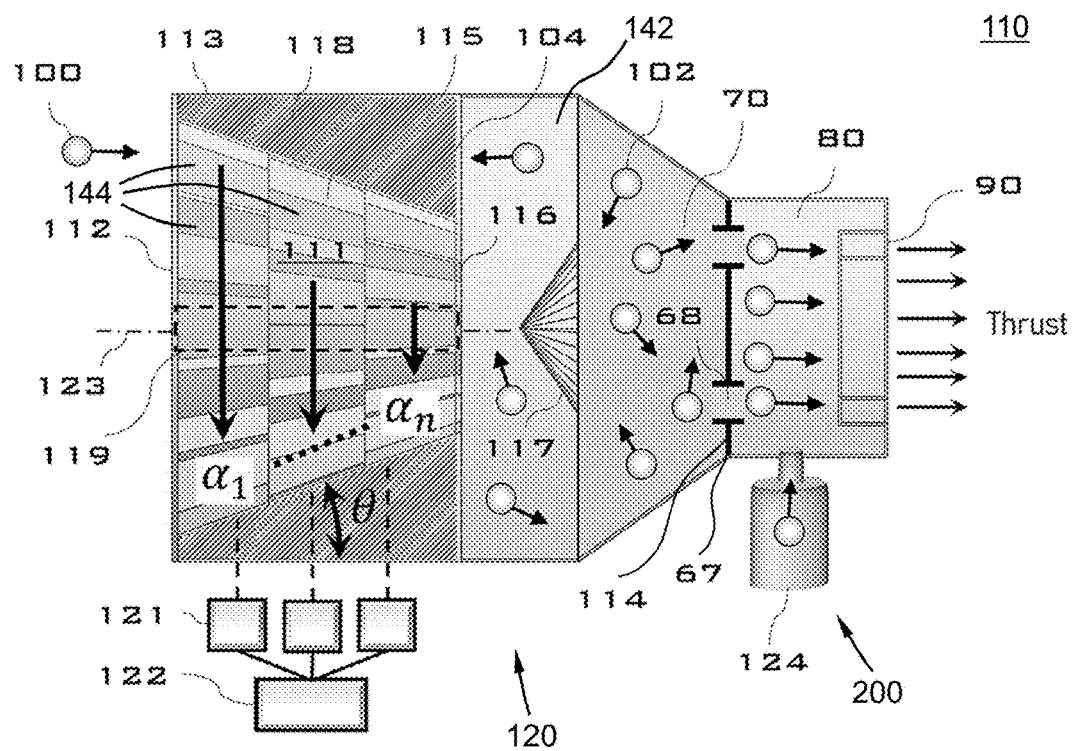
FIG. 5B shows a schematic side view of the general ABET thruster with a novel moveable motorized and controlled intake layout according to FIG. 5A.

In FIG. 5B is presented a side view of FIG. 5A that shows more clearly the mentioned angles $\alpha\_1$ to $\alpha\_n$ turning around the intake axis 123, and the conical angle θ that defines the general inclination of angled radial collector wall 115 and angled conical collector wall 116 which naturally guide the particle path through the novel intake system 120. The intake system is partially or fully integrated with core integrated payloads, e.g., mass spectrometer, antennas and cameras for earth observation missions, and/or subsystems in a core 119 of the collector 111, e.g., propulsion, thermal, telemetry, power production and distribution, among others, and/or peripheral integrated payloads and/or subsystems in the spare space 118. An additional conventional source of onboard propellant 124 can be partially or fully integrated to provide propulsion when the ABET device 110 with the motor-controlled intake system 111 is under experimentation or under limited or no operability, as for example when the intake system 120 is under experimentation as part of an ABET device 110 in very low earth orbit (equatorial) 22 or part of an ABET device in very low earth orbit (polar) 24.

The intake system 120, and in particular the angled radial collector wall 115, angled conical collector wall 116 and deflection cone 117, are simple to manufacture and to operate for reduced costs and improved reliability. The said novel intake system assembly 111 is made of and/or is at least coated with a material resistant to chemical reaction imparted by the impinging high-speed atmospheric particles 100.

Figure 6:
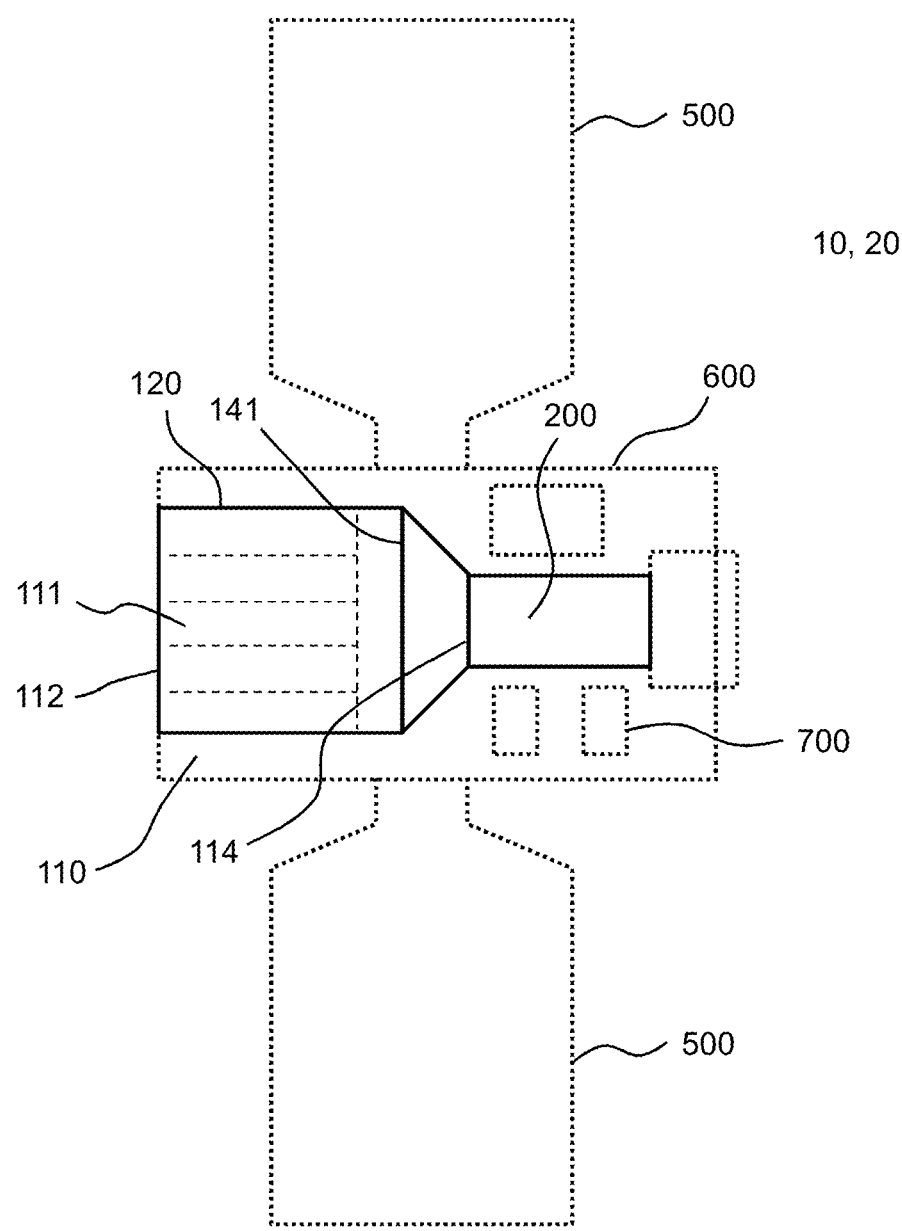
FIG. 6 shows a general assembly of a spacecraft.

FIG. 6 shows schematically a general assembly of a spacecraft 10, 20 powered by an atmosphere breathing electric thruster ABET 110. The ABET 110 comprises an intake system 120 that is coupled to the thruster 200. The intake system 120 has an inlet 112 and an outlet 114, with a collector 111 positioned in between. The spacecraft 10, 20 further can comprise solar arrays 500. The ABET 110 is mounted onto a spacecraft bus 600 on which also payload 700 can be accommodated.

Figure 7:
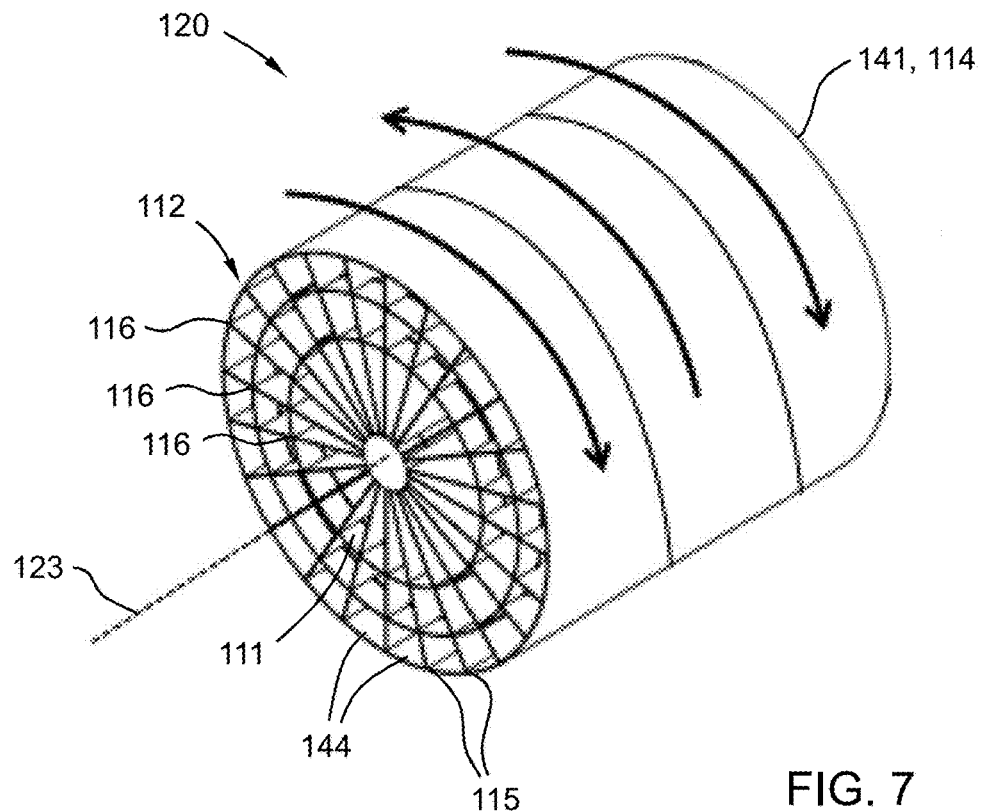
FIG. 7 shows a schematic representation of another embodiment of the intake system.

FIG. 7 shows an alternative embodiment of the collector 111 of FIG. 5A and FIG. 5B. Instead of conical circumferential walls 115, here, the circumferential walls 116 are tubular or cylindrical with radially extending walls 115, resulting in longitudinally extending channels 144. By rotating the subsequent sections with respect to each other, the radial walls 115 may not be aligned anymore, thus modifying the length of the channels 144, and thus of the path the particles 100 have to follow. Thereby, the aspect ratio is modified and thus the transmission probability of the particles 100 to reach the outlet 141, 114 can be adapted.

Figure 8:
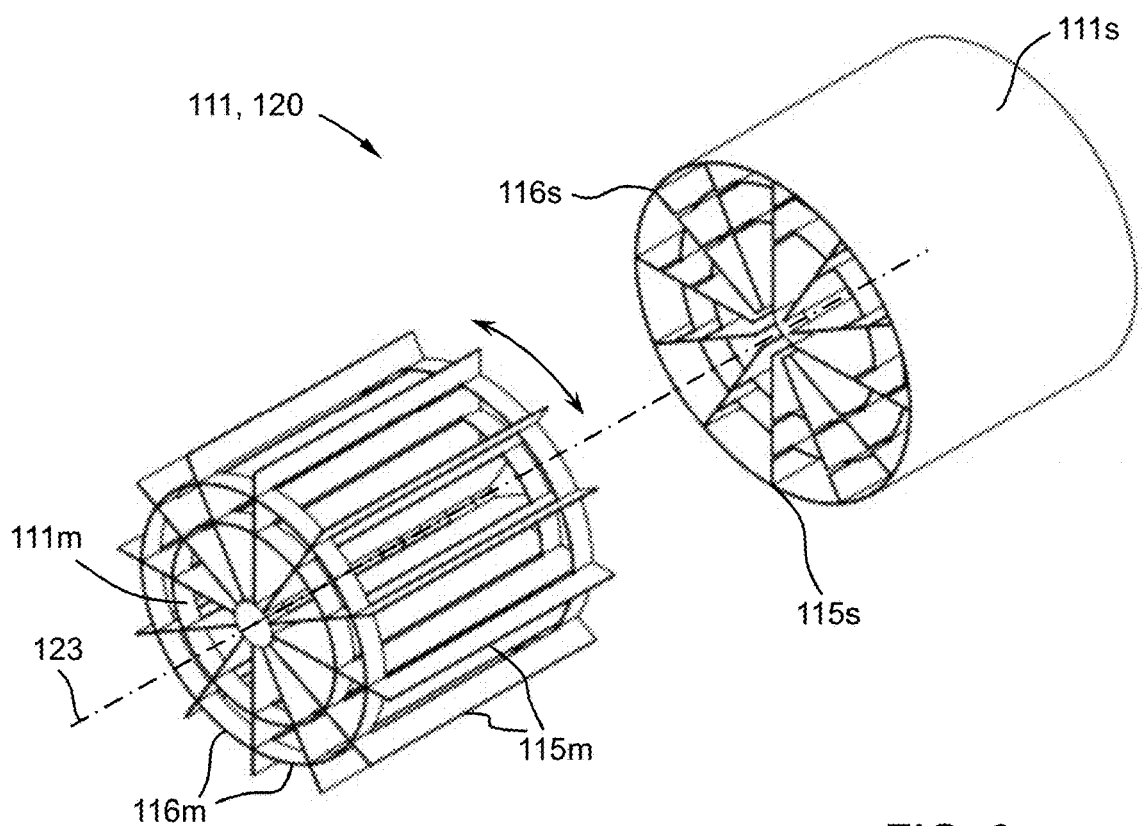
FIG. 8 shows an exploded view of a schematic representation of another embodiment of the intake system.

FIG. 8 shows an exploded view of a collector 111 having a static part 111s and a movable part 111m, that can be moved with respect to the static part 111s, in this embodiment in rotation. The movable part 111m is rotatable around the central axis 123 with respect to the static part Ills. By rotating the movable part around the axis 123, the inlet area of the channels 144 and thus the aspect ratio can be modified, as shown in FIG. 9A and FIG. 9B.

Figure 9A:
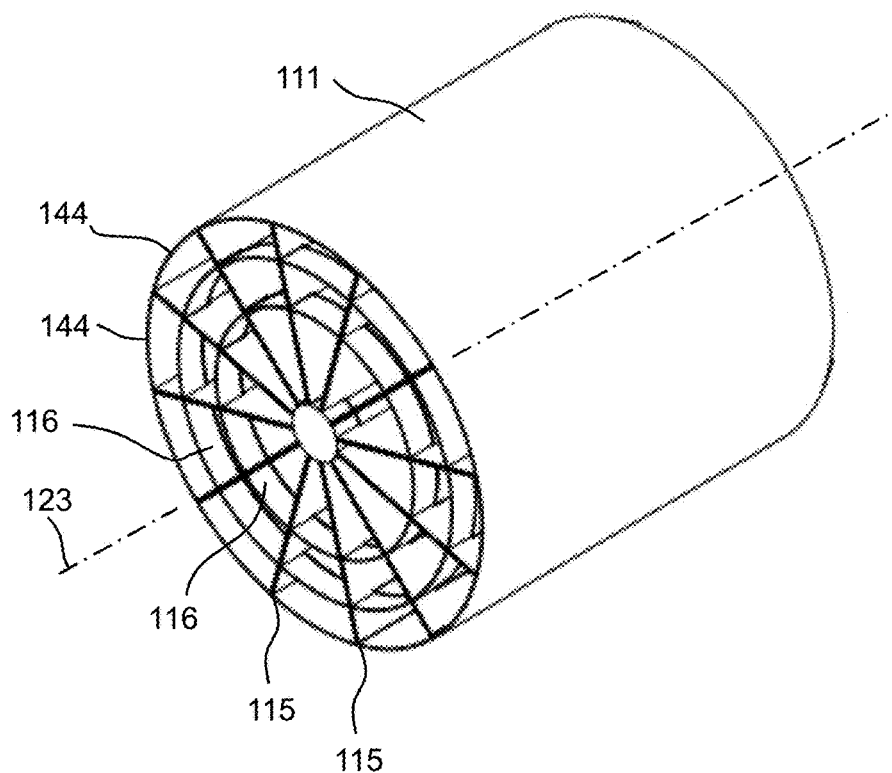
FIG. 9A and FIG. 9B show two positions of the embodiment of FIG. 8.
Figure 9B:
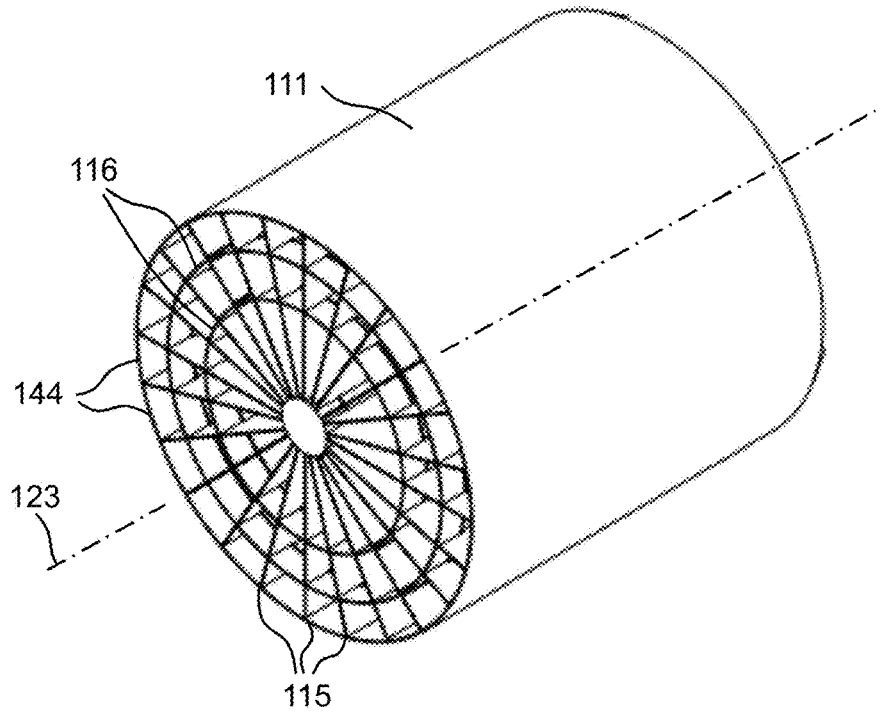

FIG. 9A and FIG. 9B show an example of the collector 111 of FIG. 8 in a position with a large aspect ratio, shown in FIG. 9A, and a position with a smaller aspect ratio, shown in FIG. 9B. Thereby, the inlet area of the collector 111 can be varied. FIG. 9A shows the collector 111 in which the radial walls 115 are rotated to form a larger cross-section of the channels 144, resulting in a larger inlet area. In FIG. 9B the radial walls 115 are rotated to reduce the cross-section of the longitudinal channels 144, and thus to reduce the inlet area and provide a smaller aspect ratio than in the arrangement of FIG. 9A. The circumferential walls 116 are here tubular or cylindrical, but can be conical as well.

Figure 10:
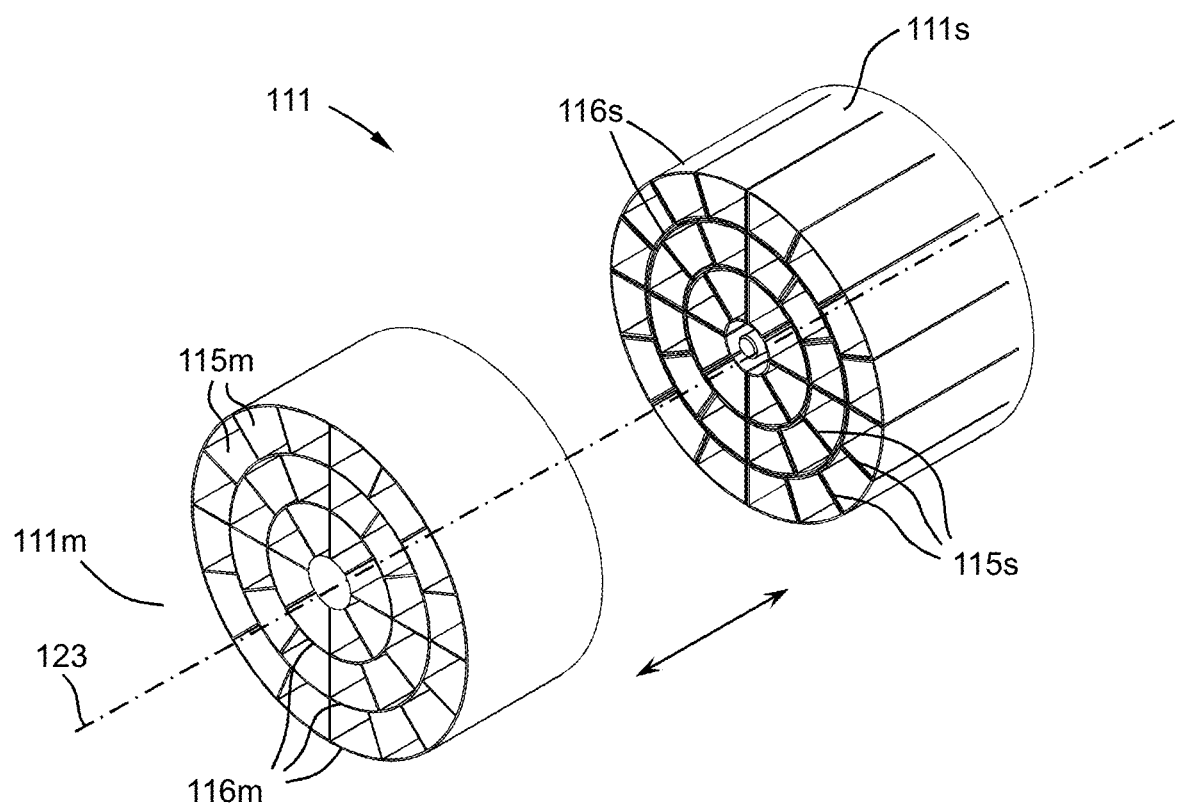
FIG. 10 shows an exploded view of a schematic representation of another embodiment of the intake system.

FIG. 10 shows an exploded view of an alternative embodiment of a collector 111 of the intake system 120. Here, the collector 111 comprises a static or fixed part 111s in which an inner part 111m is moveable, here translatable, arranged. The fixed part 111s can be provided with circumferential walls 116 and radial walls 115, while the translatable part 111m can be provided with circumferential walls 116 and radial walls 115 that are complementary arranged with respect to the walls 115, 116 of the fixed part Ills. The translatable part 111m can moved in axial direction with respect to the stationary part 111s, thus lengthening or shortening the channels 144, thereby modifying the aspect ratio of the collector 111.

Figure 11:
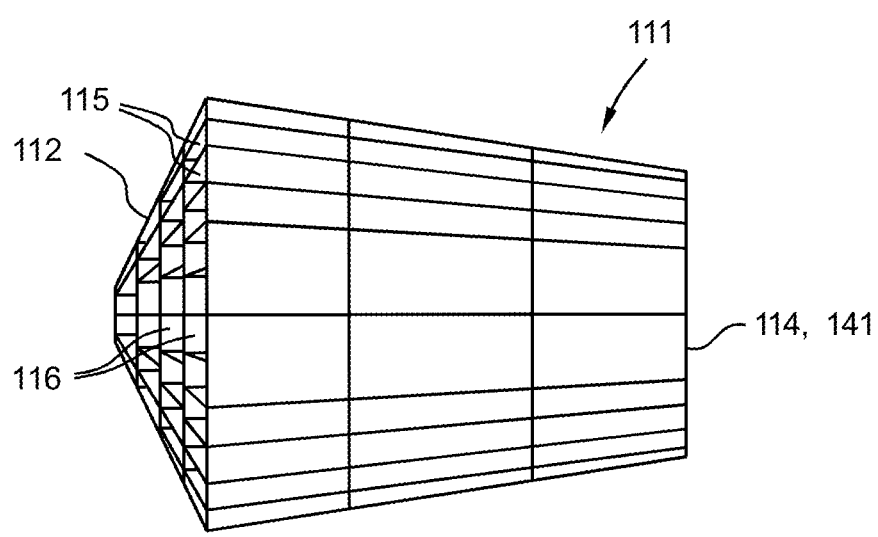
FIG. 11 shows a schematic representation of another embodiment of the intake system.

FIG. 11 show a collector 111 of an intake system 120 with a conical shaped inlet 112. The conical shaped inlet 112 reduces the drag of the intake system 120. The collector 111 is here conical shaped, but can be tubular shaped as well having a conical shaped inlet 112. The circumferential walls 116 and/or the radial walls 115 can be moveable to adjust the conical shape of the inlet 112 to further reduce drag. Thereto, the circumferential walls 116 and/or radial walls 115 can be translated in a direction along the central axis 123. The collector 111 can comprise multiple movable parts 111m, that are movable with respect to a static part 111s as to shape the conical inlet 112. The angle of the conical inlet 112 is dependent on the orbital trajectory, the attitude of the spacecraft and/or reflective properties of the intake. Both convex and concave conical shapes can be possible to reduce the drag while maintaining optimal particle collection.

Figure 12:
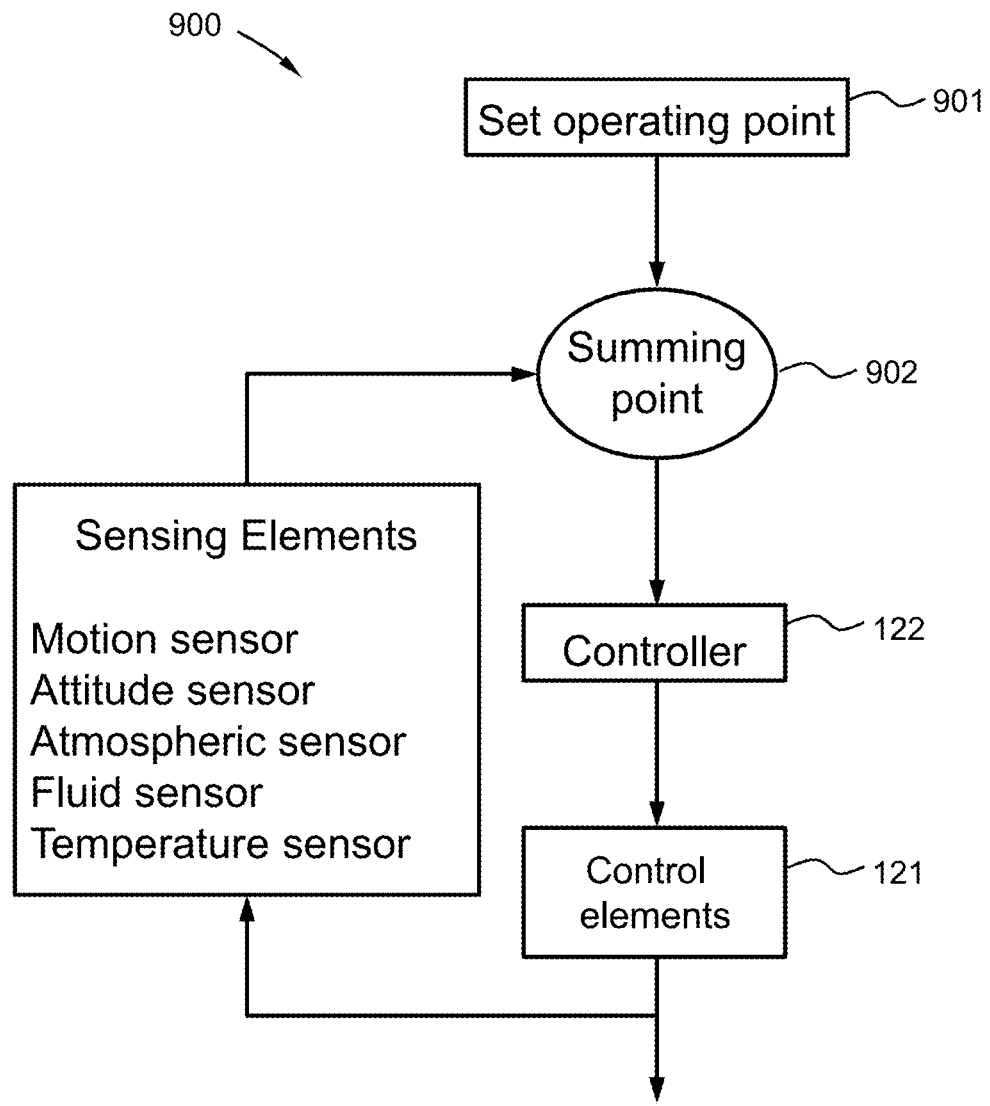
FIG. 12 shows a flow diagram of a control system.

The controller 122 or control unit 122 can be operated by a closed-loop control system 900 as shown in FIG. 12. An operating point or operating window is set prior to the mission in step 901. Sensing elements, such as a motion sensor, an attitude sensor, an atmospheric sensor, a fluid sensor, a temperature sensor etc. sense data and input these data to the controller 122. The data are collected and summed at step 902. Then, based on the input of these data, the controller 122 may calculate any deviation from the operating point and/or the operating window and will determine any adjustments to be given to the adjustable parts of the collector 111. If any adjustments to be given, instructions are provided to the control elements, such as the motors 121.

The present disclosure relates to a static or motor-controlled intake system with optionally a downstream deflector cone to achieve optimum high-speed particle collection and containment from the variable atmosphere of a satellite transiting in a given very low orbit of a planetary body, of which earth is an example, and thus enhanced the satellite thrust capability to compensate for the aerodynamic drag inherent to an object moving in such an atmosphere.

It is noted that the invention is described using schematic figures. The skilled person knows that structural elements such as connection plates and connection elements are required to implement the shown schematic examples to an intake system for a thruster of a spacecraft.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

Many variants are possible and are comprised within the scope of the following claims.

The invention claimed is:

1. An intake system for an atmosphere-breathing electric thruster, comprising:
   an inlet for an inflow of atmosphere particles;
   an outlet for coupling to the atmosphere-breathing electric thruster for fueling atmosphere particles collected from the inflow by the intake system to the atmosphere-breathing electric thruster;
   a collector arranged between the inlet and the outlet, said collector comprising multiple sections, each section of the multiple sections having circumferential walls with radial walls extending therebetween to define channels in each section of the multiple sections for allowing the inflow of atmosphere particles to pass towards the outlet, wherein said multiple sections are adjacent one another in an axial direction with respect to an axis of the circumferential walls, and the channels in each section of the multiple sections cooperate to define paths for the atmosphere particles to follow;

wherein an alignment of the channels of one section of said multiple sections relative to channels of another section of said multiple sections is adjustable by rotation of the one section relative to the another section.

2. The intake system of claim 1, wherein the channels in each section of the multiple sections are arranged, in combination, as a grid of channels, wherein walls of the grid of channels extend over the length of the collector.

3. The intake system of claim 2, wherein each section of the multiple sections is adjustable by translation relative to each other section of the multiple sections.

4. The intake system of claim 1, wherein the collector is cone-shaped and tapers towards the outlet.

5. The intake system of claim 4, wherein said circumferential walls form the cone shape with respect to the axial direction, and wherein an angle of at least one of said circumferential walls of is adjustable.

6. The intake system of claim 1, wherein the paths for the atmosphere particles to follow are adjustable as a function of environmental parameters and/or operation parameters.

7. The intake system of claim 1, further comprising a control unit for controlling a rotational position of at least one of the multiple sections.

8. The intake system of claim 1, further comprising a thermalization chamber for receiving the inflow of atmosphere particles collected by the collector.

9. The intake system of claim 8, wherein in the thermalization chamber a conical deflection surface is provided that tapers towards the inlet.

10. The intake system of claim 1, further comprising an interface wall arranged at the outlet of the intake system for connection to the atmosphere-breathing electric thruster.

11. A system for spacecraft propulsion comprising:
an intake system according to claim 1;
a thruster, coupled to the outlet of the intake system, comprising an ionization chamber for ionizing the inflow of atmosphere particles for subsequent acceleration thereof.

12. A method for collecting atmosphere particles comprising:
providing the intake system of claim 1;
determining an operating point or operating window;
receiving sensed data from at least one of: a motion sensor, an attitude sensor, an atmospheric sensor, a fluid sensor, a temperature sensor;
calculating any deviation from the operating point or operating window;
determining any adjustments required for the one section and the another section;
instructing control elements to adjust the one section and/or the another section, whereby the one section and/or the another section are adjusted.

13. The system of claim 11 further comprising the spacecraft.

14. The method of claim 12, wherein the control elements include a motor.

15. An intake system for an atmosphere-breathing electric thruster, comprising:
an inlet for an inflow of air;
an outlet for coupling to the atmosphere-breathing electric thruster for fueling the inflow of air to the atmosphere-breathing electric thruster;
a collector arranged between the inlet and the outlet, said collector comprising at least a movable section and a static section, each of the movable section and the static section having circumferential walls with radial walls extending therebetween to define channels in the movable section and the static section for allowing the inflow of air to pass towards the outlet, wherein the movable section and the static section share a common central axis over an axial direction in which the movable section and the static section extend, wherein the movable section is rotatable about the common central axis and the static section is non-rotatable about the common central axis, and the channels of the movable section and the static section cooperate to define paths for the inflow of air to follow, each path having an inlet area;
wherein the each inlet is adjustable by rotation of said movable section relative to said static section.

16. The intake system of claim 15, wherein the movable section and the static section are adjustable by translation relative to one another.

17. The intake system of claim 15, wherein at the outlet a conical deflection surface is provided that tapers towards the inlet.

18. A system for spacecraft propulsion comprising:
an intake system according to claim 15;
a thruster, coupled to the outlet of the intake system, comprising an ionization chamber for ionizing atmosphere particles in the inflow of air for subsequent acceleration thereof.

19. The system of claim 18 further comprising the spacecraft.

* * * * *